US012462559B2

(12) United States Patent
Goldstein et al.

(10) Patent No.: US 12,462,559 B2
(45) Date of Patent: Nov. 4, 2025

(54) SYSTEMS AND METHODS FOR SEMANTIC GUIDED TEMPORAL ACTIVITY DETECTION AND CLASSIFICATION OF VIDEOS

(71) Applicant: DRNC HOLDINGS, INC., Wilmington, CA (US)

(72) Inventors: Orpaz Goldstein, Los Angeles, CA (US); Sayak Nag, Riverside, CA (US)

(73) Assignee: DRNC HOLDINGS, INC., Wilmington, DE (US)

( * ) Notice: Subject to any disclaimer, the term of this patent is extended or adjusted under 35 U.S.C. 154(b) by 639 days.

(21) Appl. No.: 17/722,658

(22) Filed: Apr. 18, 2022

(65) Prior Publication Data

US 2023/0334857 A1    Oct. 19, 2023

(51) Int. Cl.
*G06V 20/40* (2022.01)
*G06V 10/20* (2022.01)

(52) U.S. Cl.
CPC ........... *G06V 20/41* (2022.01); *G06V 10/255* (2022.01); *G06V 20/47* (2022.01)

(58) Field of Classification Search
CPC ...... G06V 20/41; G06V 10/255; G06V 20/47; G06V 20/46; G06V 10/761; G06V 20/40; G06V 20/52; G06V 20/44; G06V 40/20; G06F 16/7837; G06F 16/7844; G06F 16/73; G06F 16/7867; G06F 16/738; G06F 16/732; G06F 16/248; G06F 16/43; G06F 16/24; G06F 16/743; G06F 16/95; G06F 2218/12

See application file for complete search history.

(56) References Cited

U.S. PATENT DOCUMENTS 9,361,523 B1 * 6/2016 Chen ................ G06V 20/48
11,837,027 B2 * 12/2023 Wnuk ............... G06F 16/23
(Continued)

OTHER PUBLICATIONS

W. Hu, N. Xie, L. Li, X. Zeng and S. Maybank, "A Survey on Visual Content-Based Video Indexing and Retrieval," in IEEE Transactions on Systems, Man, and Cybernetics, Part C (Applications and Reviews), vol. 41, No. 6, pp. 797-819, Nov. 2011, doi: 10.1109/TSMCC.2011.2109710. (Year: 2011).*

(Continued)

*Primary Examiner* — Andrew M Moyer
*Assistant Examiner* — Ahmed A Nasher
(74) *Attorney, Agent, or Firm* — Richard LaPeruta

(57) ABSTRACT

Disclosed is an activity detection system ("ADS") that detects, classifies, and isolates previously unseen activities in unlabeled videos based on different previously seen activities in labeled videos and semantic similarity between the unseen and seen activities. The ADS receive a first set of videos that are labeled with a first activity, and may determine a feature set within frames of the first set of videos that represents the first activity. The ADS may receive a second set of videos that are not labeled, and a query for videos of a second activity that is determined to be semantically similar to the first activity. The ADS may provide, in response to the query for the second activity, a particular video from the second set of videos containing the feature set representing the first activity that is semantically similar to the queried for second activity.

18 Claims, 8 Drawing Sheets

(56) References Cited

U.S. PATENT DOCUMENTS

2023/0351752 A1* 11/2023 Peng .................. G06V 10/82
2023/0396741 A1* 12/2023 Bendtson ......... G08B 13/19673

OTHER PUBLICATIONS

Yan, Caisia et al., "Semantics-Guided Contrastive Network for Zero-Shot Object Detection", arXiv:2019.06062v2, Dec. 31, 2021, 15 pages.

Chen, Ting et al., "A Simple Framework for Contrastive Learning of Visual Representations", Proceedings of the 37th International Conference on Machine Learning, 2020, 11 pages, Vienna, Austria.

Bansal, Ankan et al., "Zero-Shot Object Detection", ECCV 2018 LNCS, 2018, 17 pages.

Bucher, Maxime et al., "Zero-Shot Semantic Segmentation", Advances in Neural Information Processing Systems, 2019, 15 pages.

Cheng, Xiaojun et al., "Semantic Concept Discovery for Large-Scale Zero-Shot Event Detection", Twenty-fourth International Joint Conference on Artificial Intelligence, 2016, 7 pages.

Chang, Xiaojun et al., "Dynamic Concept Composition for Zero-Example Event Detection", Proceedings of the AAAI Conference on Artificial Intelligence, 2016, 7 pages.

Li, Yanan et al., "Context-Guided Super-Class Inference for Zero-Shot Detection", Proceedings of the IEEE/CVF Conference on Computer Vision and Pattern Recognition Workshops, 2020, 5 pages.

Li, Niu et al., "Zero-Shot Learning via Category-Specific Visual-Semantic Mapping and Label Refinement", IEEE Transactions on Image Processing, 2018, 15 pages.

Norouzi, Mohammad et al., "Zero-Shot Learning by Convex Combinations of Semantic Embeddings", 'arXiv:1312.565v3, 2013, 9 pages.

Xu, Xun et al., "Semantic Embedding Space for Zero-Shot Action Recognition", IEEE Transactions on Pattern Analysis and Machine Intelligence, 2015, 5 pages.

* cited by examiner

SYSTEMS AND METHODS FOR SEMANTIC GUIDED TEMPORAL ACTIVITY DETECTION AND CLASSIFICATION OF VIDEOS

BACKGROUND

Videos contain content that is not easily searchable. Besides the video title, there is often no or little text from which determine the subject matter of the video. Image recognition techniques may be used to identify objects appearing within different frames of the video. However, since there are so many frames, irrelevant and/or background objects may be identified and, in some cases, the identified objects may have little or nothing to do with the video subject matter. Tags may be manually added to the video metadata. The tags may identify the video genre (e.g., horror, comedy, sports, etc.), identify actors in the video, and/or provide other identifying information that may assist users in determining the video subject matter. However, having a human watch and manually label each newly created or uploaded video may be an impossible task that, at the very least, delays the searchability and/or availability of a video or provides similar videos with inconsistent or different tags.

DETAILED DESCRIPTION OF PREFERRED EMBODIMENTS

The following detailed description refers to the accompanying drawings. The same reference numbers in different drawings may identify the same or similar elements.

Provided are systems and methods for semantic guided temporal activity detection and classification of videos. The systems and methods may be used to search one or more unlabeled videos (e.g., streams, clips, and/or files) for footage or a sequence of frames involving specific activities or actions, to identify or select the unlabeled videos with the specific activities or actions, and/or to automatically locate the start and end times of the specific activities or actions within the identified or selected videos. In some embodiments, the systems and methods may automatically extract and/or generate a clip that contains the footage or frames involving a specific activity or action from a larger video that contains footage or frames of other activities or actions.

The semantic guided temporal detection and classification may involve a self-learning and/or semi-supervised activity detection system ("ADS") that detects, classifies, and isolates a first set of previously unseen activities in unlabeled videos based on a different second set of previously seen activities in labeled videos. In some embodiments, the ADS may determine visual features of the labeled videos demonstrate the second set of previously seen activities, may determine semantic similarity between textual terms that describe the first set of previously unseen activities and textual terms that describe the different second set of previously seen activities, and may use the visual features of a first activity to classify semantically similar second activity in a video. Specifically, the ADS may learn to adapt the visual features associated with the second set of activities to semantically related terms used to textually describe the first set of activities actions by mapping the visual features to a semantic feature space and then computing a similarity between the textual terms of the second set of activities and the textual terms of the first set of activities and/or actions. In this manner, the ADS may exploit common prior information, such as the semantic label tags and/or embeddings, in order to transfer knowledge learned from the detection of seen classes to the detection of unseen classes, self-learn, and expand its ability to classify video with previously unseen activities and/or actions. Consequently, the ADS may detect, classify, and isolate unlabeled footage or sequences of frames that contain the first set of activities without having previously seen or been provided examples of video with the first set of activities and/or actions.

Figure 1:
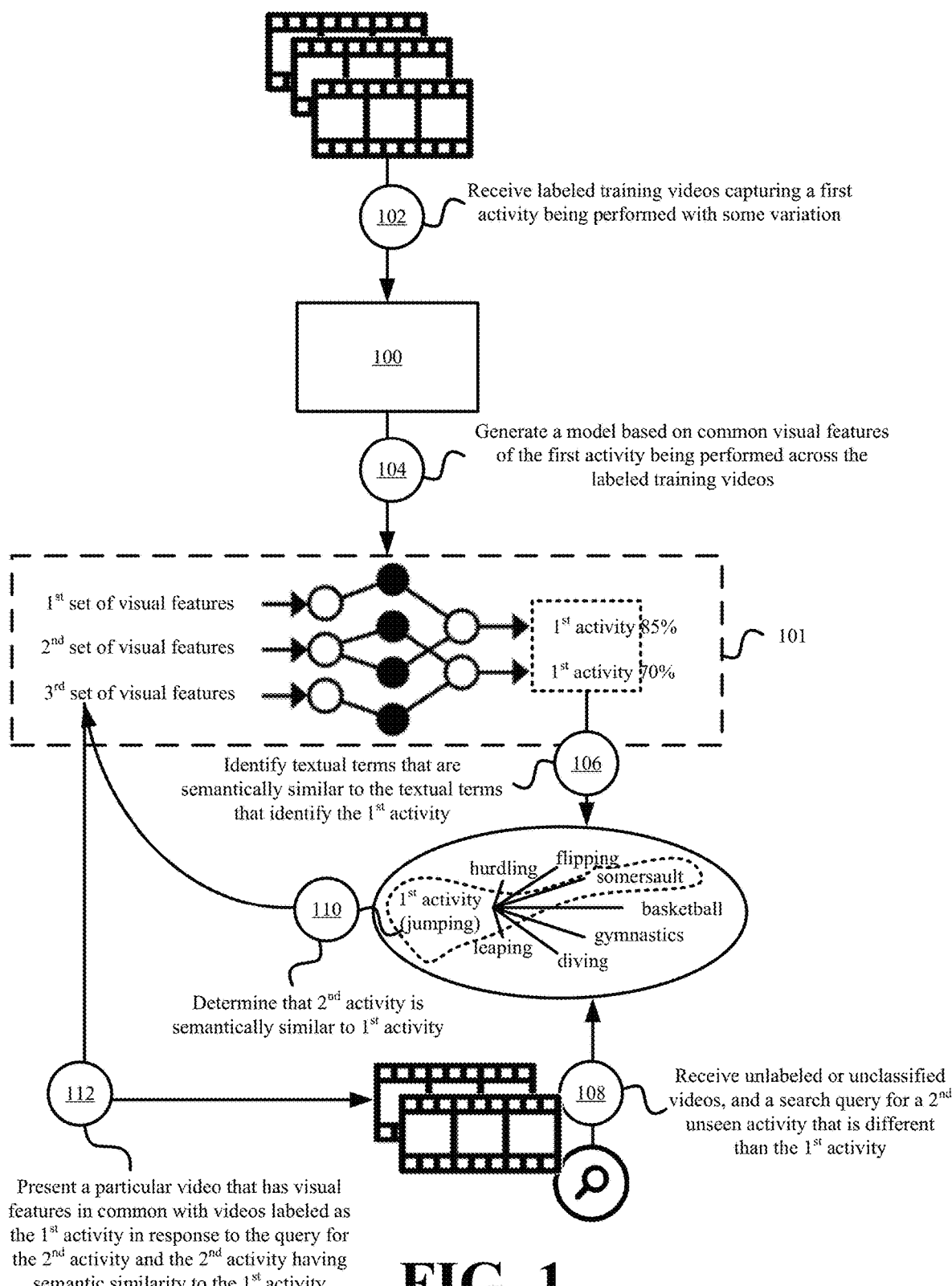
FIG. 1 illustrates an example of semantic guided temporal activity detection and classification of videos in accordance with some embodiments presented herein.

FIG. 1 illustrates an example of semantic guided temporal activity detection and classification of videos in accordance with some embodiments presented herein. ADS 100 may receive (at 102) a set of training videos that capture a first activity being performed. In some embodiments, the set of training videos may represent different examples of the first activity being performed. For instance, the set of training videos may demonstrate the first activity being performed by different actors, in different settings, from different vantage points, in different ways, and/or with some other variation.

ADS 100 may input the set of training videos into an activity detection neural network. The activity detection neural network may use one or more artificial intelligence and/or machine learning ("AI/ML") techniques to detect common visual features of the first activity being performed across the set of training videos. The common visual features may be defined based on specific movements, motion, or action, specific changes occurring within frames of the videos, and/or other temporal sequences. For instance, an activity of hitting may be defined based on a movement of a first object towards a second object followed by the second object moving away from the first object.

The activity detection neural network may generate (at 104) model 101 based on the detected common visual features. Model 101 may include one or more vectors. Each vector may be defined by a different combination of visual features, and may be associated with a different probability value. For instance, a first vector of model 101 may be defined with a first set of visual features that are detected in 70% of the set of training videos, and a second vector of model 101 may be defined with a second set of visual features that are detected in 85% of the set of training videos. Accordingly, model 101 may be used to determine that an unclassified video with the first set of visual features may involve performance of the first activity with a 70% probability, and an unclassified video with the second set of visual features may involve performance of the first activity with a 85% probability.

ADS 100 may determine textual terms that identify the first activity. In some embodiments, the textual terms may be determined from embeddings, tags, and/or metadata that are used to label and/or classify the first activity being performed in the set of training videos. In some other embodiments, the model may select the textual terms from a classification taxonomy, and may associate the textual terms to the model vectors. The textual terms may include verbs, actions, and/or nouns that represent different activities such as sports, dances, and/or names or identifiers for different activities.

ADS 100 may identify (at 106) one or more textual terms that are semantically similar to the textual terms that identify the first activity. The semantically similar terms are different than the textual terms identifying the first activity, but are related based on context, usage, definitions, and/or other associations. For instance, the first activity of "baseball" may be semantically similar to other activities such as "tennis", "ping pong", and "cricket" since they involve similar actions of hitting a ball with an instrument. Similarly, the first activity of "jumping" may be semantically similar with varying degrees to activities like "hurdling", "leaping", "diving", "flipping", "somersault", "gymnastics", and "basketball" since they involve a vertical movement of a body off one surface.

ADS 100 may receive (at 108) a second set of unlabeled or unclassified videos. ADS 100 may also receive (at 108) a search query for a second activity that is different than the first activity and that has not been previously seen by ADS 100 in the set of training videos or other labeled videos. As shown in FIG. 1, the search query may include a term for the second activity of a "somersault", whereas the model and the visual features extracted from the first set of training videos were directed to the first activity of "jumping".

ADS 100 may determine (at 110) that one or more of the textual terms within the search query used to describe the second activity are semantically similar to the textual terms identifying the first activity. Accordingly, ADS 100 may retrieve the model that was generated for classifying the first activity, and may determine (at 112) if visual features from any of the second set of unlabeled or unclassified videos contain the one or more visual features with which the model classifies the first activity with a probability that is greater than a specified classification threshold. As shown in FIG. 1, ADS 100 may determine (at 112) that a particular video in the second set of unlabeled or unclassified videos contains footage or a sequence of frames that have many of the same visual features or visual features that match by a threshold amount to features extracted from the first set of training videos showing different examples of "jumping". Since the query was for the second activity of "somersault", the second activity has semantic similarity with the first activity, and the particular video has visual features in common with videos labeled as "jumping", ADS 100 may present the particular video in response to the query for a somersault.

Figure 2:
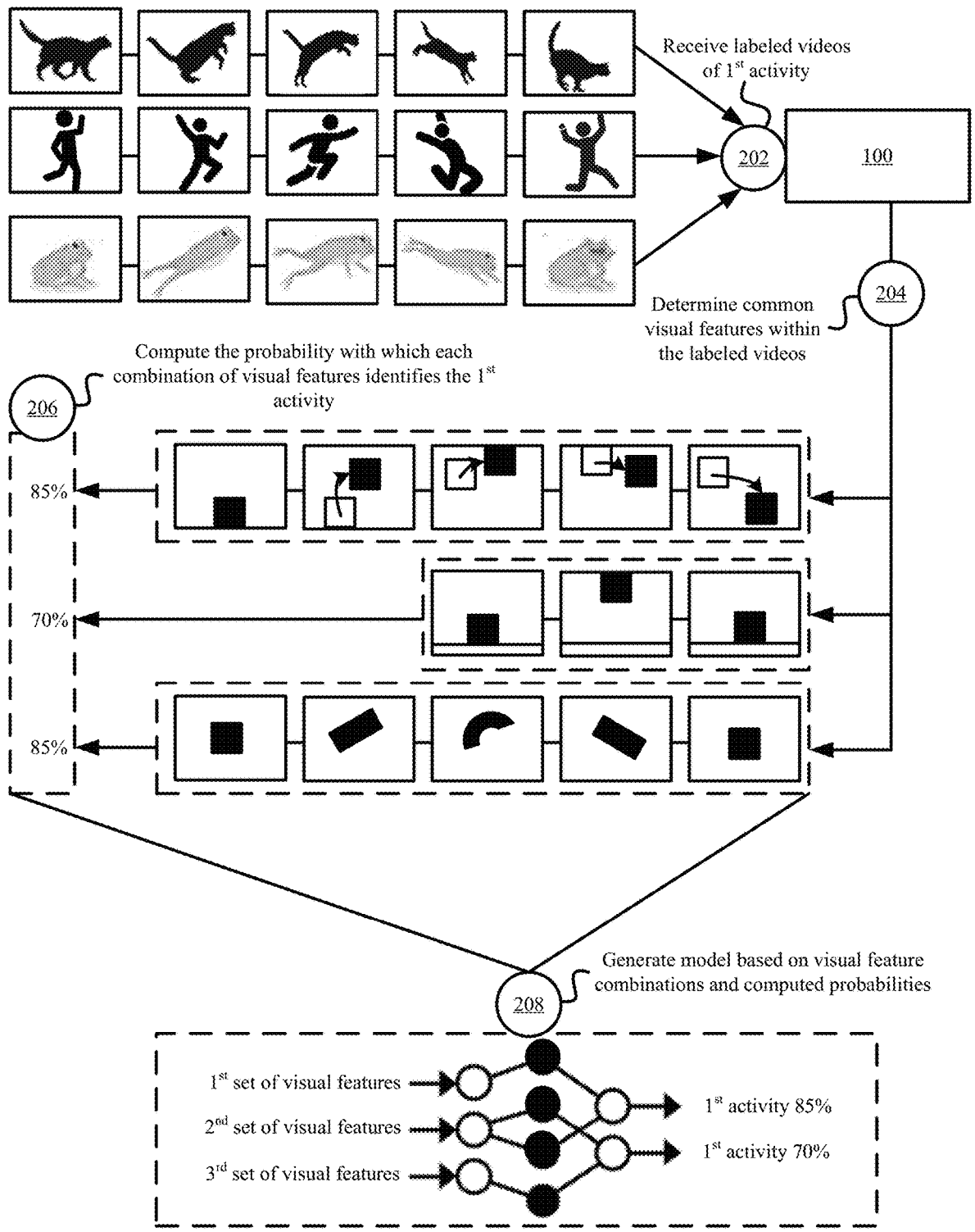
FIG. 2 illustrates an example of training an activity detection system ("ADS") with videos for a first activity or action that are used to facilitate the semantic guided classification of unlabeled videos for a second activity or action in accordance with some embodiments presented herein.

FIG. 2 illustrates an example of training ADS 100 with videos for a first activity or action that are used to facilitate the semantic guided classification of unlabeled videos for a second activity or action in accordance with some embodiments presented herein. As shown in FIG. 2, ADS 100 may receive (at 202) a first set of videos that provide three examples for the first activity or action. In some embodiments, the first set of videos may be manually labeled or tagged with textual terms that describe the first activity as "jumping". In some embodiments, the textual terms describing the first set of activity or action may be extracted from the video file name and/or video metadata.

The first set of videos may be entered as input into a neural network. The neural network may include one or more of a Convolutional Neural Network ("CNN"), Three-Dimensional CNN ("C3D"), Inflated Three-Dimensional CNN ("I3D"), Recurrent Neural Network ("RNN"), Artificial Neural Network ("ANN"), MultiLayer Perceptron ("MLP"), and/or other deep learning neural networks.

The neural network may use different AI/ML techniques (e.g., Long Short-Term Memory ("LSTM")) to perform joint classification and localization of temporal segments from the first set of videos in order to detect the common visual features that identify the activity. For instance, a CNN may be used to extract local features from each frame of video, and the extracted local features may be fed into a many-to-one multilayer LSTM network to fuse features based on commonality. In some embodiments, CNN with LSTM may be used to track the motion or movement of different objects or reference points across different frames of the video, and commonality within the tracked motion or movement may be used to define the visual features that identify a particular activity or action. The greater the variation in the videos showing the same activity, the better the AI/ML techniques are in differentiating between important or relevant visual features for the first activity and/or action from other visual features that are unimportant or irrelevant in classifying the activity.

As shown in FIG. 2, the ADS 100, based on execution of the neural network and/or AI/ML techniques, may define (at 204) a first combination of visual features for the first activity of "jumping" based on the tracked common motion detected for an object or points of reference within the first set of videos, a second combination of visual features for the first activity based on a sequential and relative positioning of two objects (e.g., a first object and a surface), and a third combination of visual features for the first activity based on changes to the form or shape of an object performing the first activity. Accordingly, the first, second, and third combination of visual features may be defined (at 204) with different sequences, amounts of visual features, data, and/or other varying specificity or granularity.

In some embodiments, the visual features may be defined based on changes to red, green, and blue ("RGB") values and/or other detected changes occurring within the first set of videos. For instance, the neural network may use a two-stream I3D network in order to obtain the spatio-temporal representations of each video. The global pooling layer of the I3D network may extract red, green, and blue ("RGB") and optical flow features from the videos. The optical flow features may include patterns of visual motion of objects, edges, or reference points in the video frames. For each video, the features may be extracted in chunks of 8 frames without overlap.

The neural network may compute (at 206) the probability with which each combination of visual features identifies the first activity based on the percentage or frequency with which each visual feature from a combination is found in each video that is labeled with the first activity, the percentage or frequency with which the same visual features are found in videos that are labeled with other activities (e.g., not the first activity), the specificity or granularity associated with each visual feature, and/or other criteria. In other words, the neural network may quantify the degree with which each set of visual features uniquely identifies the first activity and/or differentiates the first activity from other seen activities in labeled or classified videos used to train ADS 100.

The neural network may generate (at 208) a model that includes the different combinations of common visual features found amongst videos for the same activity, and the probability that measures the accuracy with which each combination of common visual features identifies that activity. ADS 100 may then enhance the model to classify videos involving an unseen second activity based on semantic similarity.

Figure 3:
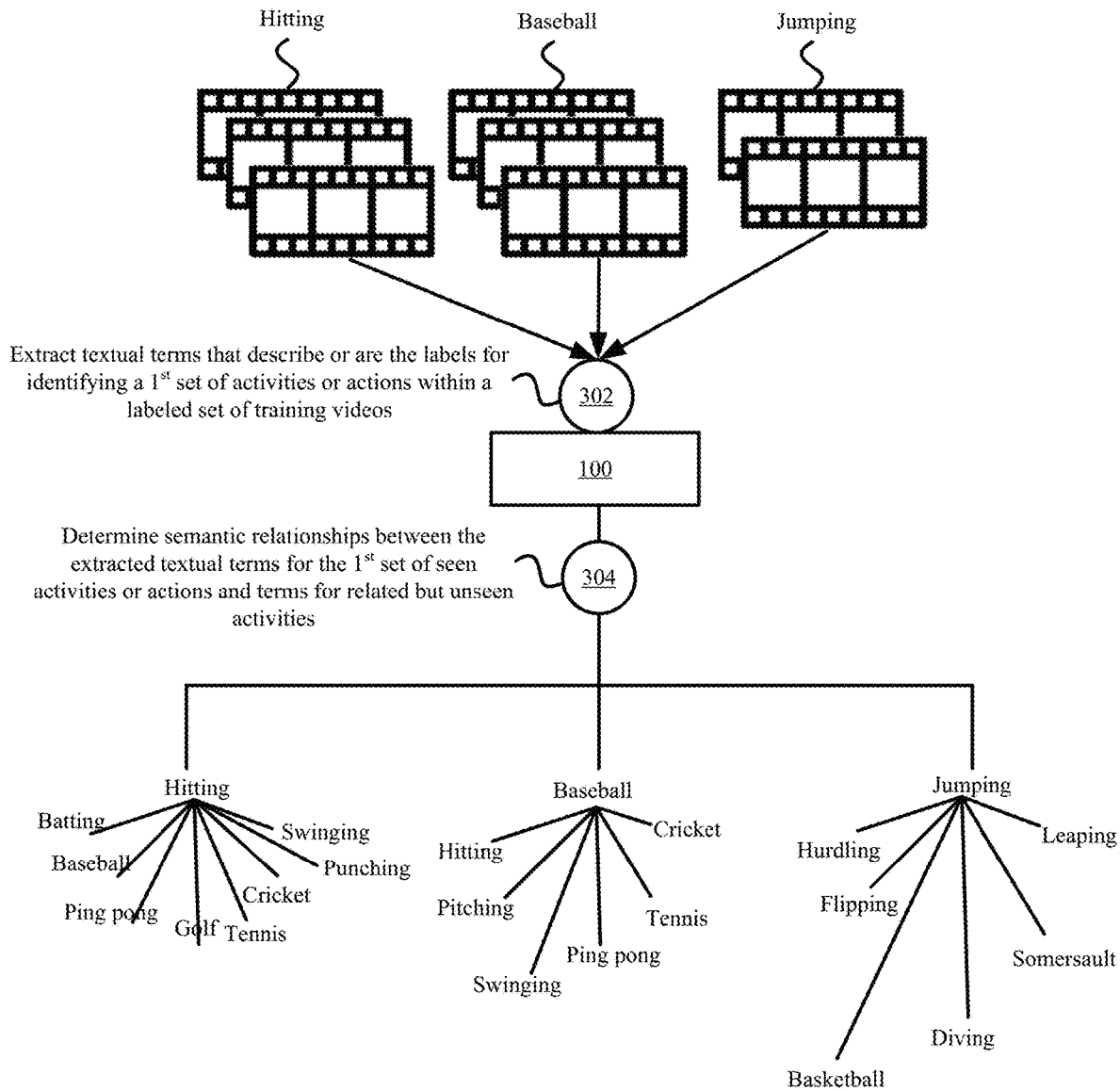
FIG. 3 illustrates an example of semantic relationships and/or contextual similarity between terms for seen activities and terms for unseen activities in accordance with some embodiments presented herein.

FIG. 3 illustrates an example of semantic relationships and/or contextual similarity between terms for seen activities and terms for unseen activities in accordance with some embodiments presented herein. ADS 100 may extract (at 302) a first set of textual terms that describe or are the labels for identifying a first set of activities or actions within a labeled set of training videos. The extracted textual terms may be used to identify seen activities and/or may be associated with the modeled visual features that are used to identify the set of activities or actions.

ADS 100 may determine (at 304) semantic relationships between the extracted textual terms for the first set of seen activities or actions and terms for related but unseen activities. In some embodiments, ADS 100 may use Word2Vec, GLoVe, and/or other natural language processing ("NLP") techniques to determine words that are semantically similar to the extracted textual terms.

The NLP techniques may find the Euclidean distance (e.g., cosine similarity) between the extracted textual terms and different word vectors. The Euclidean distance may be a measure of the linguistic, semantic, and/or contextual similarity of the word vectors to an extracted textual term. Word vectors with greater similarity to an extracted textual term may be clustered closer to that extracted textual term. For instance, ADS 100 may determine that the seen activity of "hitting" has more semantic similarity to the unseen activity of "batting" than "punching", and "punching" has more semantic similarity with "hitting" than "golf" based on a first frequency with which "hitting" and "batting" are used in the same contexts, and a second frequency with which "hitting" and "golf" are used in the same contexts. Similarly, ADS 100 may determine that the activity of "jumping" is semantically similar to the activity of "hurdling" by a first degree and is also semantically similar to the activity of "diving" by a lesser second degree since they involve vertical motion of the human body and based on definitional similarity between the terms. Semantic similarity may also be determined between nouns that are representative of different activities. For instance, baseball may be semantically similar to tennis, ping pong, and cricket as each involve the use of a racket, bat, or other instrument to hit a ball or moving object.

ADS 100 may generate a modified model for semantic guided temporal activity detection and classification of videos based on the modeled visual features for the seen activities and the determined terms for describing unseen activities that have semantic similarity to and/or contextual relationships with the extracted terms for describing the seen activities. ADS 100 may use the modified model to classify previously seen or unseen activities in one or more unlabeled videos, and/or to respond to search criteria with terms that describe unseen activities and that have semantic similarity or contextual relationships with terms that describe seen activities.

Figure 4:
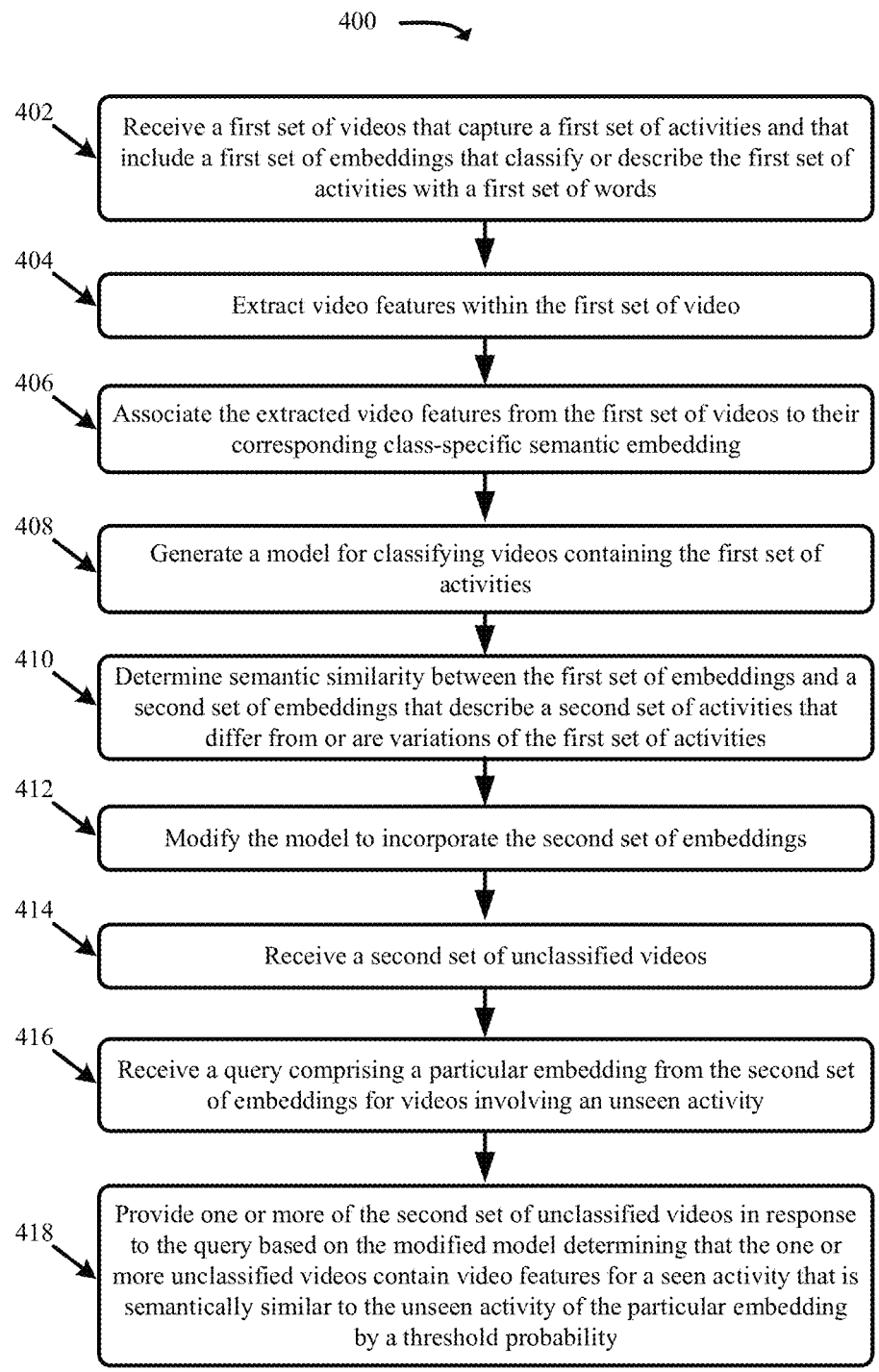
FIG. 4 presents a process for performing the semantic guided temporal activity detection and classification of videos in accordance with some embodiments presented herein.

FIG. 4 presents a process 400 for performing the semantic guided temporal activity detection and classification of videos in accordance with some embodiments presented herein. Process 400 may be implemented by ADS 100. In some embodiments, ADS 100 may run on or in conjunction with a server or device of a video hosting platform, content distribution service, and/or search provider. In some embodiments, ADS 100 may be integrated as part of the video hosting platform, content distribution service, and/or search provider. For instance, ADS 100 may integrate with a video streaming service that has a vast library of unlabeled video content, and may allow users to define custom searches for identifying videos that contain desired activities or content. The unlabeled video content may include content that one or more users upload to the video streaming service, and/or legacy or new content from video creators. In some embodiments, ADS 100 may be run on a local machine, and may be used to classify videos that are stored on the local machine or are accessed from remote sources.

Process 400 may include receiving (at 402) a first set of videos that capture a first set of activities and that include a first set of embeddings that classify or describe the first set of activities with a first set of words. Each activity from the first set of activities may span multiple frames or images within a video of the first set of videos. The first set of videos may include multiple videos that demonstrate the same activities from different views, with variations in the motion or movement associated with the activity, in different settings, with different actors, and/or with other variations. Accordingly, different sets of frames associated with an activity in different videos may capture different starting points and/or ending points for the activity.

Process 400 may include extracting (at 404) video features within the first set of vide. The extracted (at 404) video features may include tracked motion detected for an object or points of reference, a sequential and relative positioning of two objects within the first set of videos, changes to the form or shape of an object associated with a particular activity in different videos, other optical flow features, changes to RGB values, and/or other detected changes occurring within the first set of videos.

In some embodiments, the video feature extraction may involve performing a temporal activity detection across the first set of videos using one or more neural networks and/or AI/ML techniques. The temporal activity detection may include a simultaneous classification and localization in time of multiple action instances in the first set of videos. In some embodiments, the temporal activity detection may involve using a two-stage detector that performs temporal proposal generation during the first stage and action classification during the second stage to extract (at 404) the video features. In some embodiments, extracting (at 404) the video features may include using a C3D to extract short-term spatio-temporal features of each video segment along with fixed positional encodings.

Process 400 may include associating (at 406) the extracted video features from the first set of videos to their corresponding class-specific semantic embedding. Specifically, ADS 100 may obtain the embeddings from each video of the first set of videos, and may associate the one or more embeddings obtained for a particular video to the video features that are extracted (at 404) from that video. In other words, ADS 100 may map the video features to a semantic feature space so that the video features are linked to one or more textual terms that classify or label the activity demonstrated by those video features.

Process 400 may include generating (at 408) a model for classifying videos containing the first set of activities. The model may include different combinations of video features that are commonly and/or frequently found within one or more of the first set of videos that are classified with a particular activity. Each combination of video features may be defined in a particular sequence. For instance, video features for the activity of throwing may include motion of a hand with an object going from behind to in front of the human body and the object leaving the hand as the hand moves in front of the human body at the end of the sequence, whereas video features for the activity of catching may include motion of an empty hand starting in front of the human body and an object entering into the hand at the end of the sequence.

Each combination of video features may be represented as a vector, and generating (at 408) the model may include computing a probability for each combination of video features and/or vector. The probability may be computed based on the number and/or percentage of seen videos with a particular classification (e.g., a subset of the first set of videos with the same embedding) that have a particular combination of video features and/or the number and/or percentage of seen videos with other classifications that include that same particular combination of video features. A higher probability may be assigned to the particular combination of video features when the particular combination of video features is unique and found within most or all of the seen videos with the particular embedding, and a lower probability may be assigned to the particular combination of video features when the particular combination of video features appears in a lesser percentage of the seen videos with the particular embedding and/or appears in videos with other embeddings.

Generating (at 408) the model may include providing the video features with or without fixed positional encodings to an MLP. The MLP may perform a feature encoding that transforms the extracted video features into a compact representation. The output of the feature encoding may be represented as:

$$Z_E = \Sigma_{j=1}^{Le} U^T(E,j)(F(x)+\text{pos}(F(x))) \quad (1)$$

F(x) may include the feature representations of a video segment, pos(F(x)) may include the fixed positional encodings extracted for the video segment, $U^T(E,j)$ may be the weight matrix of the $j^{th}$ layer of the encoder, and Le may correspond to the layers of the encoder. The MLP output (e.g., encoded video representation $Z_E$) may be provided to a transformer encoder/decoder.

The transformer encoder/decoder may leverage multiple encoder-decoder and stacked multi-headed attention to aggregate and/or model the long-term spatio-temporal relationships from the feature encoding into action queries. Accordingly, the transformer encoder/decoder may learn the inter-dependencies of all actions in a pair-wise manner, which it uses to refine the action queries and transform them into a set of action predictions.

The set of action predictions may be collection of the video features of all activities in a video clip, which are then decoded to their respective class labels and temporal coordinates by one or more detection heads. The detection heads may be used to independently decode the action predictions into the class labels and temporal coordinates. In some embodiments, semantic alignment heads may be used to learn the relationship between the visual and semantic features (e.g., the extracted video features and the semantic embeddings) of the seen activities by establishing an effective visual-semantic mapping.

In some embodiments, one or more loss functions may be used to improve the accuracy of the model. The loss functions may compare the video features from the different videos that are labeled for the same activity in order to filter out the video features that are not common across the videos while retaining the video features that are common and/or related in the different videos that are labeled for the same activity. Specifically, the loss function filtering may eliminate irrelevant background video features and/or video features involving motion or movement that are unrelated to the classified activity.

Process 400 may include determining (at 410) semantic similarity between the first set of embeddings used to classify the activities of the first set of videos and a second set of embeddings that describe a second set of activities that differ from or are variations of the first set of activities. Determining (at 410) the semantic similarity may include performing NLP based on the wording of the first set of embeddings, a corpus of different words, and relationships and/or associations between the first set of embeddings and various words within the corpus. The corpus may be limited activities or words that ADS 100 is permitted to search for, or may include all words from a dictionary.

The NLP may compute a distance between each embedding of the first set of embeddings and each word from the corpus based on contextual relevance, definitional relevance, linguistic usage, and/or other associations. In some embodiments, the NLP may cluster words to the first set of embeddings based on the computed distance between them. For instance, a word that is contextually relevant, definitionally relevant, and used interchangeably with a particular embedding may be clustered closer to the particular embedding in a semantic space, and a word that is not contextually relevant, definitionally relevant, or used interchangeably with the particular embedding may be clustered further from the particular embedding in the semantic space. The second set of embeddings may be defined based on the clustering proximity between words from the corpus to the first set of embeddings.

Process 400 may include modifying (at 412) the model to incorporate the second set of embeddings. For instance, modifying (at 412) the model may include associating a vector with a particular combination of video features and a first probability for a first activity classification from the first set of embeddings to a semantically similar second activity classification from the second set of embeddings. ADS 100 may adjust the probability for the second activity classification based on the amount of semantic similarity detected between wording of the first embedding for the first activity classification and wording of the second embedding for the second activity classification.

Process 400 may include receiving (at 414) a second set of unclassified videos. The unclassified videos may include newly created videos, uploaded videos, and/or existing videos within a library that have not been classified and/or do not contain any activity embeddings.

Process 400 may include receiving (at 416) a query comprising a particular embedding from the second set of embeddings. In other words, the query may request videos involving a particular unseen activity.

Process 400 may include providing (at 418) one or more of the second set of unclassified videos in response to the query based on the modified model determining that the one or more unclassified videos contain video features for a seen activity that is semantically similar to the unseen activity of the particular embedding by a threshold probability. In some embodiments, ADS 100 may respond to the query by detecting a vector within the modified model that is associated with the particular embedding, determining a particular combination of video features defined for the vector, searching the second set of unclassified videos for the particular combination of video features, and returning the one or more unclassified videos within the second set of unclassified videos that include the particular combination of video features defined for the vector that is associated with the particular embedding.

In some other embodiments, ADS 100 may input the second set of unclassified videos into the modified model. The modified model may classify and/or tag relevant embeddings from the first set of embeddings and semantically similar embeddings from the second set of embeddings to the unclassified videos that contain the combination of video features for the relevant embeddings from the first set of embeddings. In some such embodiments, ADS 100 may respond to the query by searching the embeddings associated with the second set of unclassified videos for the particular embedding, and may return the one or more unclassified videos that are tagged with the particular embedding.

In some embodiments, ADS 100 may combine object recognition with the semantic guided temporal activity detection and classification of videos to improve the result accuracy (e.g., relevance of videos returned for a requested unseen activity). For instance, the user may search for the activity of "tennis". If ADS 100 is trained using videos with the activity of "baseball", ADS 100 may determine that baseball, ping pong, and tennis are semantically similar. Accordingly, ADS 100 may return videos of tennis, ping pong, and/or baseball since ADS 100 uses the same features extracted from the labeled baseball videos to identify the semantically similar activities of tennis and/or ping pong.

However, ADS 100 may perform object recognition within one or more frames of the search results in order to return only the tennis videos. The object recognition may identify a first subset of videos within the search results that include objects identified as baseball bats and baseball hats, a second subset of videos within the search results that include objects identified as a table and paddles, and a third subset of videos within the search results that include objects identified as tennis rackets and a tennis court. Accordingly, ADS 100 may filter the search results that are classified with the semantically similar activities of baseball, ping pong, and tennis to return only the third subset of videos that include the objects associated with the activity of tennis.

Figure 5:
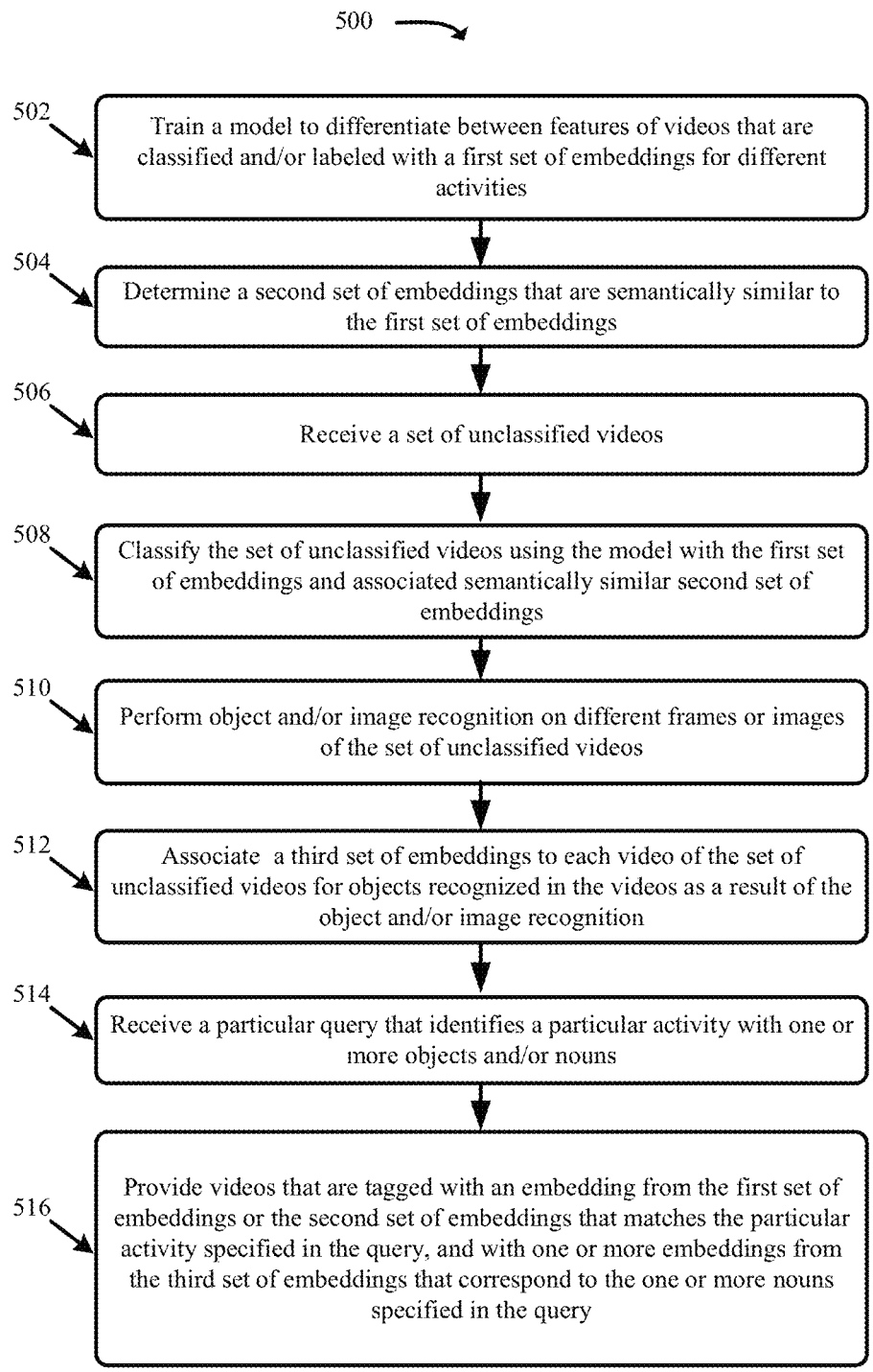
FIG. 5 presents a process for combining object recognition with the semantic guided temporal activity detection and classification of videos in accordance with some embodiments.

FIG. 5 presents a process 500 for combining object recognition with the semantic guided temporal activity detection and classification of videos in accordance with some embodiments. Process 500 may be implemented by ADS 100.

Process 500 may include training (at 502) a model to differentiate between features of videos that are classified and/or labeled with a first set of embeddings for different activities. Process 500 may include determining (at 504) a second set of embeddings that are semantically similar to the first set of embeddings and that are not associated with the classified video used to train (at 502) the model.

Process 500 may include receiving (at 506) a set of unclassified videos. The set of unclassified videos may include videos that are not tagged or labeled with activity embeddings.

Process 500 may include classifying (at 508) the set of unclassified videos using the model with the first set of embeddings and associated semantically similar second set of embeddings. In some cases, the classifications based on the semantically similar second set of embeddings may produce false positives or may broadly classify some unrelated activities to the activity identified by an embedding from the second set of embeddings.

To improve the classifications, process 500 may include performing (at 510) object and/or image recognition on different frames or images of the set of unclassified videos, and associating (at 512) a third set of embeddings to each video of the set of unclassified videos based on the object and/or image recognition. The third set of embeddings may identify objects or nouns detected within those frames and/or images.

Process 500 may include receiving (at 514) a particular query that identifies a particular activity with one or more objects and/or nouns. In response to the particular query, process 500 may provide (at 516) one or more of videos that are tagged with an embedding from the first set of embeddings or the second set of embeddings that matches the particular activity specified in the query, and with one or more embeddings from the third set of embeddings that correspond to the one or more nouns specified in the query. In some embodiments, process 500 may return all videos that are tagged with an embedding that matches the particular activity, but may rank or order the videos to prioritize those videos that are also tagged with embeddings from the third set of embeddings that correspond to the one or more nouns specified in the query. In this manner, ADS 100 may improve the accuracy or relevance of the videos returned in response to the particular query.

Figure 6:
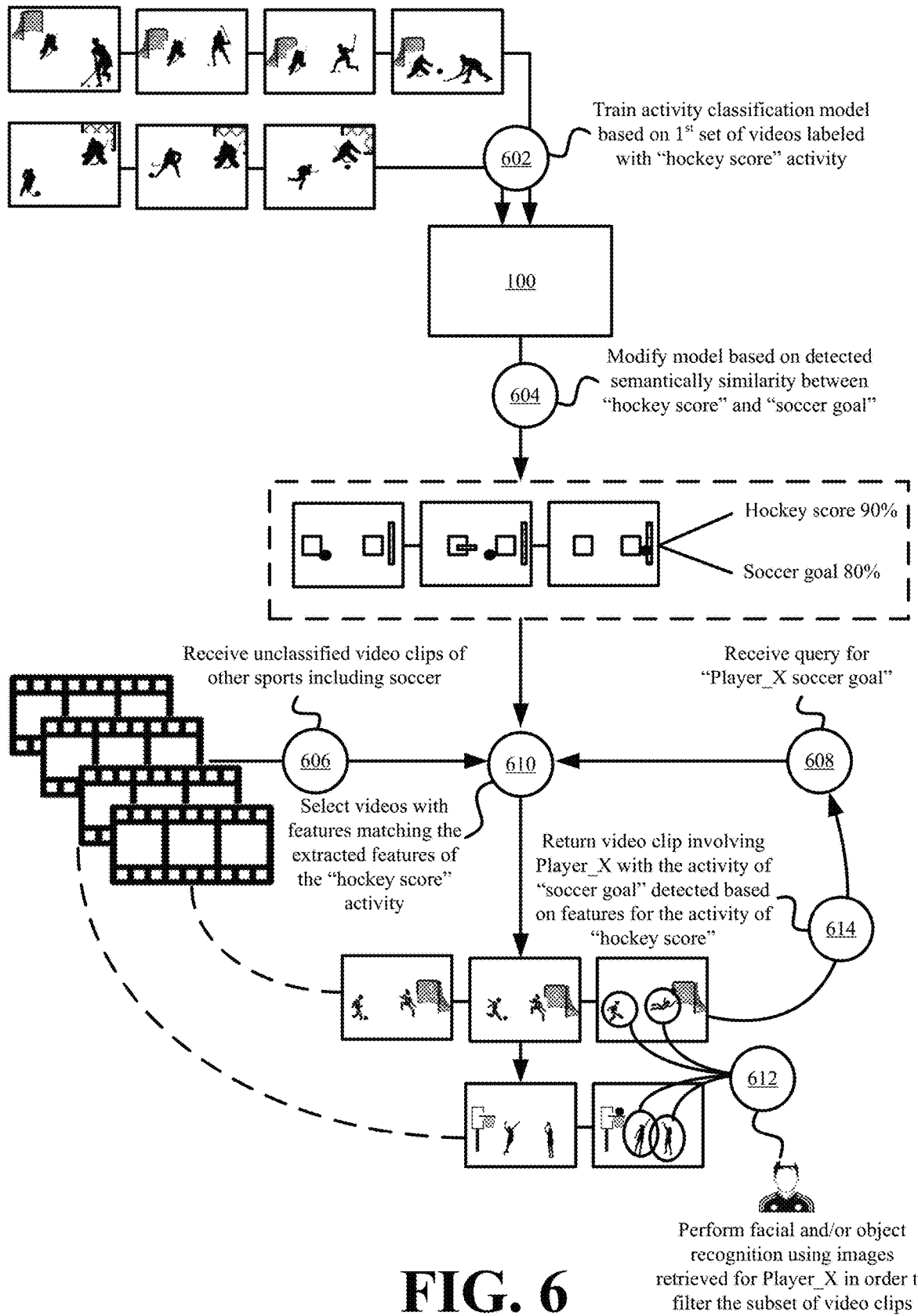
FIG. 6 illustrates an example of combining object recognition with the semantic guided temporal activity detection and classification of videos to improve results for unseen activities in accordance with some embodiments.

FIG. 6 illustrates an example of combining object recognition with the semantic guided temporal activity detection and classification of videos to improve results for unseen activities in accordance with some embodiments. As shown in FIG. 6, ADS 100 may be trained (at 602) using a first set of videos that are tagged with the activity of "hockey score". The first set of videos may include hockey players shooting a puck past a goalie into a net or goal.

ADS 100 may determine (at 604) that the activities of "soccer goal" and "basketball field goal" are semantically similar and/or contextually related to the activity of "hockey score". Accordingly, ADS 100 may modify a trained model, that is used to detect the activity of "hockey score" based on a set of features extracted from the first set of videos, to link the "soccer goal" and "basketball field goal" activities to that same set of features and/or the "hockey score" activity.

ADS 100 may receive (at 606) unclassified video clips of other sports including soccer and basketball, and may receive (at 608) a search query for "Player—X soccer goal". Player_X may be the name or another identifier for a particular soccer player (e.g., team name and jersey number).

ADS 100 may determine that queried for activity of "soccer goal" is semantically similar to the seen activity of "hockey score", and may use the one or more modeled combinations of features associated with the "hockey score" classification to select (at 610) a subset of the unclassified video clips that involve different players shooting, and scoring in hockey, soccer, and basketball. For instance, ADS 100 may analyze the set of unclassified video clips for features that include the sequence of a player shooting an object past another player into a net or goal.

Rather than return the subset of video clips in response to the query for "Player_X soccer goal", ADS 100 may perform (at 612) facial and/or object recognition using images retrieved for Player_X in order to filter the subset of video clips, and to retain only the video clips that are classified with the activity of "soccer goal" and that include a recognized image of Player_X. Consequently, ADS 100 may remove all hockey and basketball related video clips since none of the hockey and basketball video clips include the soccer player identified as Player_X, and may return (at 614), in response to the query, the soccer video clips involving Player_X scoring a goal despite ADS 100 having never been trained on videos involving passing, shooting, or scoring in soccer.

In some embodiments, ADS 100 may reverse the order of selecting (at 610) the semantically similar videos and performing (at 612) the facial and/or object recognition. For instance, ADS 100 may first filter the received (at 606) unclassified video clips using the facial and/or object recognition to retain only a set of unclassified video clips that include images or frames with a recognized image of Player_X. ADS 100 may then search the set of unclassified video clips for video clips that contain the semantically similar activities of different players shooting, and scoring in hockey, soccer, and basketball. In either implementation, the results returned (at 614) in response to the query may include soccer video clips involving Player_X scoring a goal and may exclude video clips of other soccer activities (e.g., passing), other sports, or video clips that do not involve Player_X.

In some embodiments, ADS 100 may lookup the term "soccer" to determine specific objects that are associated with soccer including a soccer ball, soccer goal, soccer pitch, etc. ADS 100 may filter the semantically classified videos based on object recognition involving these other specific objects to ensure that only soccer videos are returned and that videos for other semantically similar activities (e.g., hockey, field hockey, basketball, rugby, etc.) are excluded from the search results.

The semantic guided temporal activity detection and classification of videos may be used to generate different output for different use cases. For instance, the examples provided above may include responding to a search query with links to videos with a seen classification or an unseen classification that is semantically similar to a seen classification. In some embodiments, the semantic guided temporal activity detection and classification of videos may include editing a video to automatically identify and extract a clip of the searched for activity.

Figure 7:
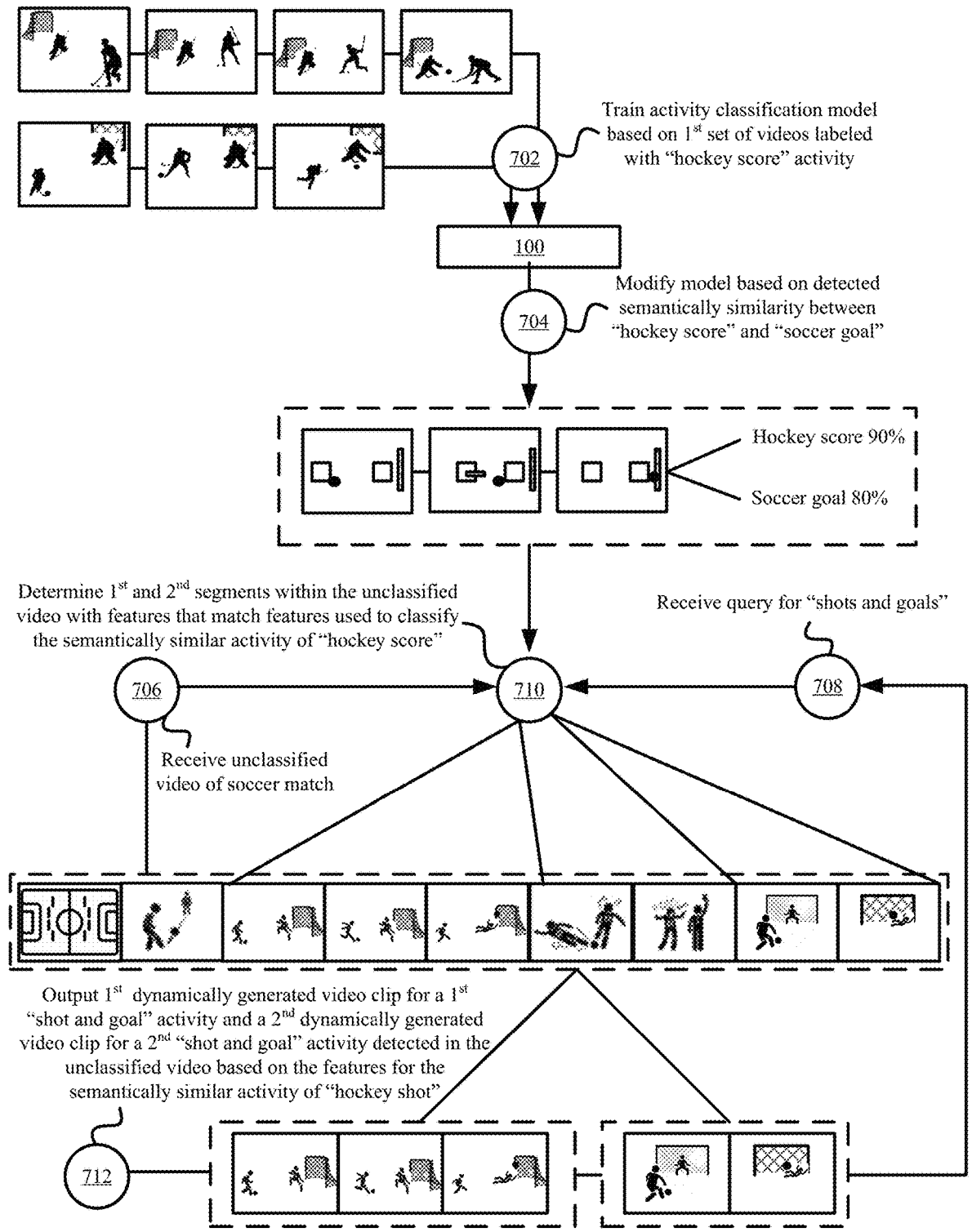
FIG. 7 illustrates an example of extracting a clip of a previously unseen activity from a video using the semantic guided temporal activity detection and classification in accordance with some embodiments presented herein.

FIG. 7 illustrates an example of extracting a clip of a previously unseen activity from a video using the semantic guided temporal activity detection and classification in accordance with some embodiments presented herein. ADS 100 may be trained (at 702) using a first set of videos that are tagged with the activity of "hockey score", and that include video features for an object moving from one player into a net or goal. ADS 100 may modify (at 704) the trained model to classify activities that are semantically similar to "hockey score", such as "soccer goal", with the common sequence or combination of features within the first set of videos that were most relevant to the activity of "hockey score".

ADS 100 may receive (at 706) an unclassified video of an entire soccer match, and may receive (at 708) a query for ADS 100 to present only the "shots and goals" from that soccer match. Since the activities of "shots" and "goals" are determined to be semantically similar to the activity of "hockey score", ADS 100 may use the same features identified for the activity of "hockey score" to isolate clips of soccer players shooting or scoring goals from the larger unclassified video. As shown in FIG. 7, ADS 100 may determine (at 710) that a first segment and a second segment within the unclassified video include video features for an object moving from a player towards and/or into a net. For each of the first segment and the second segment, ADS 100 may determine a first frame where the activity begins (e.g., a first frame containing the first video feature in the sequence of video features for an object moving from one player into a net or goal) and a second frame where the activity ends (e.g., a second frame containing the last video feature in the sequence of video features for an object moving from one player into a net or goal), and may extract all frames between the first frame and the second frame to generate a clip of the desired activity.

ADS 100 may output (at 712) a first dynamically generated video clip with the first segment and a second dynamically generated video clip with the second segment in response to the query. In this manner, ADS 100 may be used to extract clips of specific activities from a larger video without a user manually identifying the specific activities and/or without training ADS 100 with labeled examples of those activities.

Figure 8:
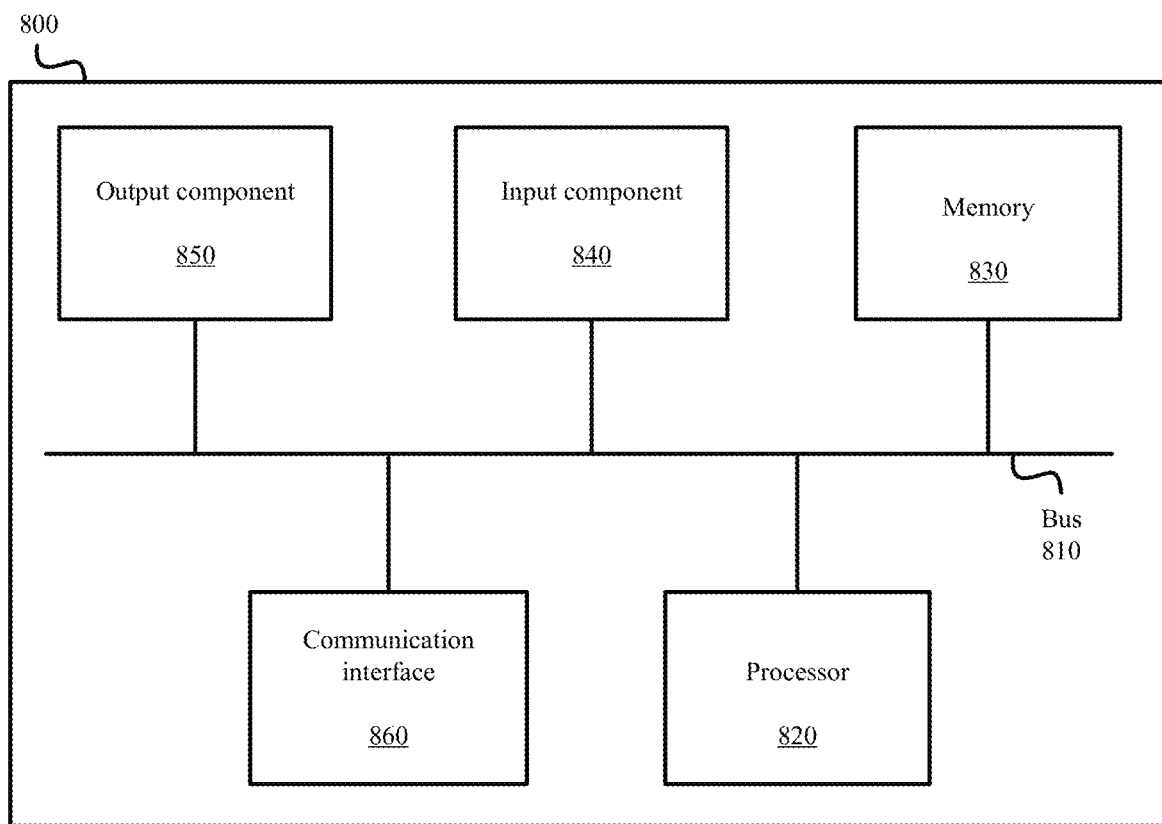
FIG. 8 illustrates example components of one or more devices, according to one or more embodiments described herein.

FIG. 8 is a diagram of example components of device 800. Device 800 may be used to implement one or more of the devices or systems described above (e.g., ADS 100, a video hosting platform associated with ADS 100, a content distribution service associated with ADS 100, a search provider associated with ADS 100, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining a set of features that occur within a sequence of frames within a first set of videos, the first set of videos depicting a first activity;
   determining, in response to a query for a second activity that is different from the first activity, one or more videos depicting the second activity, wherein determining the one or more videos depicting the second activity comprises analyzing a second set of videos using at least one of the set of features determined from the first set of videos depicting the first activity:
   providing the one or more videos from the second set of videos determined using the at least one of the set of features determined from the first set of videos;
   determining that a second video from the second set of videos comprises the at least one feature of the set of features that represent the first activity;
   performing object recognition across one or more frames of the second video;
   determining that the second video does not contain a particular object as a result of the object recognition; and
   removing the second video from a response to the query for the one or more videos of the second activity in response to determining that the second video does not contain the particular object.

2. The method of claim 1, wherein the first set of videos depicting the first activity comprises an assigned label, the assigned label providing a textural term that represents an action.

3. The method of claim 1, wherein determining the set of features comprises:
identifying a sequence of motions performed by one or more objects across different frames of the first set of videos.

4. The method of claim 1, wherein determining the set of features comprises:
identifying common visual features within different sets of frames in a number of the first set of videos.

5. The method of claim 4, further comprising:
computing a probability with which the set of features represent the first activity based on the number of the first set of videos that include the common visual features.

6. The method of claim 1, further comprising:
generating a model for classifying videos with the set of features to the first activity.

7. The method of claim 6, further comprising:
modifying the model to associate the second activity and the first activity as classifications for videos containing the at least one feature of the set of features.

8. The method of claim 1 further comprising:
scanning a plurality of frames of the one or more videos for a particular sequence of frames comprising a first frame that contains a first feature of the set of features and a last frame that contains a last feature of the set of features; and
dynamically generating a clip from the one or more videos based on the particular sequence of frames, wherein the clip comprises the first frame, the last frame, and other frames from the plurality of frames that are in between the first frame and the last frame.

9. The method of claim 8, wherein providing the one or more videos comprises:
providing the clip instead of all the plurality of frames from the one or more videos in response to the query.

10. The method of claim 1, wherein the determining the one or more videos depicting the second activity comprises:
performing the object recognition across the one or more frames of the second set of videos; and
displaying, in response to the object recognition across the one or more frames, at least one feature of the set of features and the particular object associated with one or more terms in the query for the second activity.

11. A system comprising:
one or more processors; and
at least one storage medium having encoded thereon executable instructions that, when executed by the one or more processors, cause the one or more processors to carry out a method comprising:
determining a set of features that occur within a sequence of frames within a first set of videos, the first set of videos depicting a first activity;
determining, in response to a query for a second activity that is different from the first activity, one or more videos depicting the second activity, wherein determining the one or more videos depicting the second activity comprises analyzing a second set of videos using at least one of the set of features determined from the first set of videos depicting the first activity:
providing the one or more videos from the second set of videos determined using the at least one of the set of features determined from the first set of videos;
determining that a second video of the second set of videos comprises at least one feature of the set of features that represent the first activity;
performing object recognition across one or more frames of the second video;
determining that the second video does not contain an object, as a result of the object recognition; and
omitting the second video from the one or more videos of the second activity in response to determining that the second video does not contain the object.

12. The system of claim 11, wherein the method further comprises:
classifying the one or more videos with the second activity.

13. The system of claim 11, wherein determining the set of features comprises:
identifying a sequence of motions performed by one or more objects across different frames of the first set of videos.

14. The system of claim 11, wherein the method further comprises:
scanning a plurality of frames of the one or more videos for a particular sequence of frames comprising a first frame that contains a first feature of the set of features and a last frame that contains a last feature of the set of features; and
dynamically generating a clip from the one or more videos based on the particular sequence of frames, wherein the clip comprises the first frame, the last frame, and other frames from the plurality of frames that are in between the first frame and the last frame.

15. The system of claim 14, wherein providing the one or more videos comprises:
providing the clip instead of all the plurality of frames from the one or more videos in response to the query.

16. A method comprising:
in response to receipt of a query for a second activity that is different from a first activity, determining one or more videos that depict the second activity from among a second set of videos, wherein the determining the one or more videos comprises analyzing the second set of videos using a set of features associated with a first set of videos that depict the first activity that is different from the second activity;
determining that a second video of the second set of videos comprises at least one feature of the set of features that represent the first activity;
performing object recognition across one or more frames of the second video;
determining that the second video does not contain an object, as a result of the object recognition; and
omitting the second video from the one or more videos of the second activity in response to determining that the second video does not contain the object.

17. The method of claim 16, wherein the determining the one or more videos depicting the second activity comprises further comprising:
performing the object recognition across one or more frames of a first video of the second set of videos; and
outputting the one or more videos,
wherein the outputting comprises verifying that the first video comprises outputting, in response to the object recognition across the one or more frames, at least one feature of the set of features and an object that is associated with one or more terms in the query for the second activity.

18. The method of claim 16, further comprising:
outputting the one or more videos that depict the second activity.

\* \* \* \* \*